his invention relates to a new and improved method
United States Patent Office 3,738,807
Patented June 12, 1973

3,738,807
METHODS OF REDUCING WATER EVAPORATION
Samuel I. Horowitz and Robert J. Kufrin, Verona, N.J., assignors to Witco Chemical Corporation, New York, N.Y.
No Drawing. Filed Sept. 20, 1971, Ser. No. 182,255
Int. Cl. B01j 1/18
U.S. Cl. 21—60.5 A    9 Claims

ABSTRACT OF THE DISCLOSURE

Water loss due to evaporation from a body of water in a catchment, reservoir, channel, and the like, is inhibited by applying a liquid bitumen-polyurethane composition on the surface of said body of water, said polyurethane being cured in situ on said body of water to form a continuous cohesive thin thermoplastic bituminous membrane on the surface of the water.

---

This invention relates to a new and improved method to inhibit evaporation from a body of water by using an in situ cured bitumen-polyurethane membrane on the surface of the body of water.

One of the major causes of water loss from reservoirs in addition to seepage is through evaporation into the atmosphere. A number of methods have been proposed to control evaporation from large bodies of water. Such methods are found for instance in U.S. 2,797,141 issued to Veatch, on June 25, 1957, which covers a process for spraying a mixture of dipropyleneglycol, resin particles and carbon black on the surface of the water; U.S. 2,903,-330 issued to Dressler, on Sept. 8, 1959, which deals with this problem by application of a fatty alcohol-water emulsion to the surface of the water; U.S. 3,095,263 issued to Eckert et al., on June 25, 1963, which teaches the use of a wax dissolved in a hydrocarbon solvent; U.S. 3,199,944 issued to Gabor et al., on Aug. 10, 1965, which utilizes an ester of a fatty acid; U.S. 3,258,306 issued to Beredjick, on June 28, 1966, which makes use of an imidazoline in alcohol solution; and 2,907,627 issued to Cummings, on Oct. 6, 1959, incorporated herein by reference, which utilizes a polyurethane foam of up to 3″ on the surface of an enclosed liquid reservoir to inhibit the evaporation of any volatile liquid and particularly crude petroleum or volatile fractions thereof, such as gasoline. When a body of water is covered using the Cummings invention, however, the polyurethane layer formed by the Cummings composition is not completely water impervious, and a thicker layer must be applied to the body of water to arrive at the most effective evaporation control. Secondly, and most importantly, polyurethane foam even in a very thin layer, which is not satisfactory for the present purpose, is not particularly commercially feasible because of the high cost of the polyurethane. By the present invention, a method is made availabe which utilizes a bitumen-polyurethane elastomer or foam type composition which forms a more water impermeable coating even as a thin layer, and is more commercially feasible because of the low cost of the bitumen-polyurethane composition.

According to the present invention, an improved method for inhibiting evaporation from a body of water such as from water catchments, reservoirs, channels, and the like, is made available, which comprises utilizing a continuous thermoplastic film of liquid bitumen-polyurethane composition, hereinafter more fully described, that will cure or set in situ at ambient conditions to form a thermoplastic floating membrane barrier on the surface of the water, having suitable cohesive strength and elasticity. The bitumen-polyurethane liquid mixture may be cured using agents such as the known catalysts, cross-linking agents or mixtures thereof, and in some instances curing may occur spontaneously upon contact with the water. In still other instances, the bitumen-polyurethane composition may set without curing to a consistency which is effective to inhibit evaporation of water. The composition may contain blowing agents such as the Freons, water, and the like, as known in the art.

It is well known that polyurethane polymers may be prepared from one or two component systems that will cure or set after application. Either system may be advantageously employed in accordance with the practice of the present invention.

Compositions of bitumen-polyurethane, according to the present invention, are liquid compositions which are applied as relatively thin continuous films, and which cure or set in place under ambient conditions into a continuous cohesive membrane that exhibits good physical properties, toughness, and abrasion resistance, with sufficient elasticity to compensate for liquid level fluctuations over a relatively wide range of temperatures. Generally, the physical characteristics, rather than the chemical structure of the materials employed would be controlling in their choice. In light of the present specifications, a person skilled in the art can select materials to provide the desired characteristics, although materials as subsequently discussed herein are preferred.

The cohesive thermoplastic layer of cured bitumen-polyurethane, according to the present invention, provides effective inhibition of vapor loss and provides protection against subsequent contamination of the water which it covers. It becomes particularly useful as a practical means for the preservation of water supplies in hot arid areas of the world.

The present process provides a practical means to inhibit evaporation from an aqueous media and is not applicable to other volatile liquids such as mineral oil, organic liquids such as gasoline, benzene, acetone and the like, because of the detrimental softening effect imparted by these liquids to the bitumen-polyurethane coating possibly due to solubility, absorption, or other physical phenomenon.

Generally, the polyurethane-bitumen compositions used in the method of the present invention may comprise by weight between about 10% and 90% and preferably between 10% and 40% of the polyurethane component and between about 90 and 10% and preferably between 90% and 60% of the bitumen component. Compositions having more bitumen than polyurethane are preferred because of cost considerations.

It is known that some polyurethane resins are not compatible with specific bitumens and these polyurethanes are not intended as being used with the specific bitumen. For instance, polyester polyurethane resins are generally not compatible with asphalt. However, particularly suitable polyurethane resins which are compatible with asphalt materials are those which are the reaction product of a polyisocyanate with polydiene polymers or copolymers containing terminal allylic hydroxy groups and which are commercially available for instance under the trade name "Poly B–D," sold by Arco Chemical Company, Philadelphia, Pa., and these are preferred when asphalt is used in the present composition.

When coal tar derivatives are used in the present process, such as for instance coal tar distillates, cut-backs, and the like, they are admixed with polyurethanes prepared from a polyhydroxy or polycarboxy polymer and a polyisocyanate, as known in the art, because these polyol and polyester type polyurethane resins generally exhibit greater compatibility with tars. Coal tar distillate resins, such as are disclosed in U.S. application Ser. No. 182,554 by Henry T. Ingram and Samuel I. Horowitz, filed of even date herewith, can be used in the present compositions. These coal tar distillate resins are produced by treating a coal tar distillate oil at elevated temperature and pressure.

The polyisocyanates that may be employed in preparing the polyurethane resins used in the present compositions are well known in the art and may be any organic polyisocyanate having 2, 3, or more functional or reactive isocyanate groups and may be aromatic, aliphatic or aliphatic-aromatic such as toluene diisocyanate, hexamethylene diisocyanate and 4,4' methane diisocyanate and the like. The amount of polyisocyanate to be used will generally be determined so as to provide a range from about 0.8 to 1.5 or even more equivalents of isocyanate groups per active hydrogen in the resin.

The thin thermoplastic membrane evaporation barriers according to the present invention, as stated above, may be prepared from elastomeric or foam compositions which are generally well known in the art and require no further discussion herein. Both the elastomeric and the foam type have been found to be useful in the practice of the present invention. The elastomer is preferred because it makes possible a thinner membrane to accomplish the same result and when using solvents, the development of a true foam is impaired.

The liquid bitumen-polyurethane compositions may be applied by any of the numerous known commercial techniques as for instance, by spraying or casting, although spray coating has been found to be most advantageous. Whereas the coating compositions according to the present invention are preferably liquid at ambient temperatures, adjusting the particular viscosity to adapt to the application techniques employed may be accomplished by heating or using compatible solvents systems as known in the art, such as toluene, naphtha, methylethyl ketone and the like, and mixtures thereof. Coatings of at least about 0.01" and preferably between 0.04" and 0.07" are employed according to the present invention to effectively inhibit evaporation from a body of water.

Whereas the bitumen-polyurethane floating membranes made according to the present process can be used as evaporation barriers for bodies of water, where the water is intended for industrial, agricultural, or for human and animal consumption, because of the unpalatable taste imparted to the water by tar derivatives, they are not recommended for use where human water consumption is intended.

It is within the scope of the present invention to admix polyhydroxy resins, as known in the art, that are reactive with isocyanate groups with the polyester or polydiene polymer to prepare bitumen-polyurethane compositions having properties suitable for particular application. Other additives such as silica, natural and synthetic fibers, antioxidants, fungicides, plasticizers, and so forth, may be added as known in the art, without departing from the intent of the present invention.

This invention is further indicated by the following examples which are illustrative and in no way limiting of its scope. All percentages are reported by weight.

EXAMPLE 1

A two component elastomeric coating composition is prepared as follows:

Component A

| | Percent |
|---|---|
| Hydroxy terminated polybutadiene polymer | 32.2 |
| Propoxylated sorbitol polyether resin (M.W. 500–700) | 13.8 |
| Asphalt composition: | |
|   Asphalt | 20 |
|   Mineral spirits | 10.6 |
| Toluene | 21.1 |
| Tertiary amine catalyst | 1.8 |
| Antioxidant | 0.5 |

Component B

| | Percent |
|---|---|
| Asphalt composition: | |
|   Asphalt | 37.6 |
|   Mineral spirits | 20.2 |
| Toluene diisocyanate | 15.1 |
| Toluene | 27.1 |

The asphalt composition in this example is a mid-continent oxidized asphalt having an ASTM ball and ring softening point of 180° F. dissolved in mineral spirits. The hydroxy terminated polydiene polymer in this example is a polydiene polymer containing terminal allylic hydroxy groups purchased under the tradename Poly B–DR–45M. The tertiary amine catalyst is available under the tradename Dabco LV–33.

Components A and B are prepared separately by mixing the materials until a homogeneous mixture is obtained.

A body of water of about 25' by 10' by about 3' deep at its deepest point simulated at Perth Amboy, N.J., is sprayed with a mixture of components A and components B above in sufficient quantity to cover the entire surface of the water by standard commercial spraying technique. The cured polyurethane-asphalt resin becomes tack-free, tough and elastic after about 24 hours. The coating thickness ranges from about 0.05" to 0.06". After exposure to the elements for three months and six months the water level remains not perceptibly lower.

EXAMPLE 2

A two component foam type coating composition is prepared as follows, wherein the designation "phr." stands for "pounds per hundred pounds of resin":

Component A

| | |
|---|---|
| Hydroxyterminated polybutadiene polymer percent | 60 |
| Propoxylated sorbitol polyether resin (M.W. 500–700), percent | 40 |
| Silicone emulsifier phr | 1.5 |
| Water phr | 3.8 |
| Tertiary amine catalyst phr | 3.8 |
| Dibutyl tin dilaurate phr | 0.2 |
| Toluene phr | 10.0 |

Component B

| | Phr. |
|---|---|
| Asphalt composition: | |
|   Asphalt | 85 |
|   Mineral spirits | 15 |
| Toluene diisocyanate | 48.54 |

The asphalt composition, the hydroxy terminated polydiene polymer, and the tertiary amine catalyst are the same as in Example 1.

Components A and B are mixed and sprayed on a body of water as in Example 1 to produce a continuous foam type, (not a true foam) thermoplastic layer on the surface of the water, having a coating thickness ranging from 0.06"–0.07". After exposure to the elements for three months and six months the water level remains not perceptibly lower.

EXAMPLE 3

A two component elastomeric composition is prepared as follows:

Component A

| | Percent |
|---|---|
| Coal tar distillate | 45.1 |
| Polyoxypropylene glycol (M.W. 800) | 37.3 |
| Propoxylated sorbitol polyether resin (M.W. 500–700) | 7.8 |
| Naphtha | 7.8 |
| Triethylene diamine | 2.0 |

Component B

| | Percent |
|---|---|
| Coal tar distillate | 60.7 |
| Polymethylene polyphenyl isocyanate | 39.3 |

The coal tar distillate represents a fraction distilling at below 250° C. from the distillation of crude coal tar.

Components A and B are mixed and cast on a body of water to produce a protective layer ranging from about 0.04″–0.06″. After exposure to the elements for three months and six months the water level remains not perceptibly lower.

The method of the present invention may be used in conjunction with the method described in the United States Pat. 3,555,828 which teaches applying a liquid elastomeric coating composition over soil and soil stratum surfaces and then curing said composition to form a continuous cohesive membrane which inhibitis water loss due to seepage into the soil substrate surfaces. Thus, when the present method is used in conjunction with the method described in this patent, a complete envelope about the entire body of water is made possible. U.S. 3,555,828, issued to Goldstein et al., on Jan. 19, 1971, is incorporated herein by reference.

We claim:

1. The method of inhibiting water loss by evaporation from a body of water which comprises applying a liquid composition comprised of bitumen and polyurethane over the surface of the body of water, said polyurethane being cured in situ, whereby a cohesive continuous thermoplastic-bituminous membrane is formed on the surface of said body of water, said polyurethane being derived from the reaction of a polyisocyanate and a polymer or copolymer.

2. The method of claim 1 wherein said continuous membrane is about 0.01″ to about 0.07″ thick.

3. The method of claim 1 wherein said bitumen-polyurethane composition is in the form of an elastomer.

4. The method of claim 1 wherein said bitumen is a coal tar distillate or cut-back and said polyurethane being derived from the reaction of a polyisocyanate and a polyester or polyol.

5. The method of claim 4 wherein said coal tar polyurethane composition is in the form of an elastomer.

6. The method of claim 1 wherein said bitumen is an asphalt and said polyurethane being derived from the reaction of a polyisocyanate and a polydiene polymer or copolymer containing terminal allylic groups.

7. The method of claim 6 wherein said continuous membrane comprises between about 10% and 40% by weight of said polyurethane and between 90 and 60% by weight of said asphalt.

8. The method of claim 6 wherein said continuous membrane is about 0.01″ to about 0.07″ thick.

9. The method of claim 6 wherein said asphalt-polyurethane composition is in the form of an elastomer.

References Cited

UNITED STATES PATENTS

| | | | |
|---|---|---|---|
| 1,814,053 | 7/1931 | Mueller | 21—60.5 X |
| 2,797,141 | 6/1957 | Veatch | 21—60.5 R |
| 2,903,330 | 9/1959 | Dressler | 21—60.5 R |
| 2,907,627 | 10/1959 | Cummings | 21—60.5 A |
| 3,095,263 | 6/1963 | Eckert et al. | 21—60.5 R |
| 3,199,944 | 8/1965 | Gabor et al. | 21—60.5 R |
| 3,258,306 | 6/1966 | Beredjick | 21—60.5 R |
| 3,555,828 | 1/1971 | Goldstein et al. | 61—1 R |

MORRIS O. WOLK, Primary Exaimner

D. G. MILLMAN, Assistant Examiner